Figure 1:
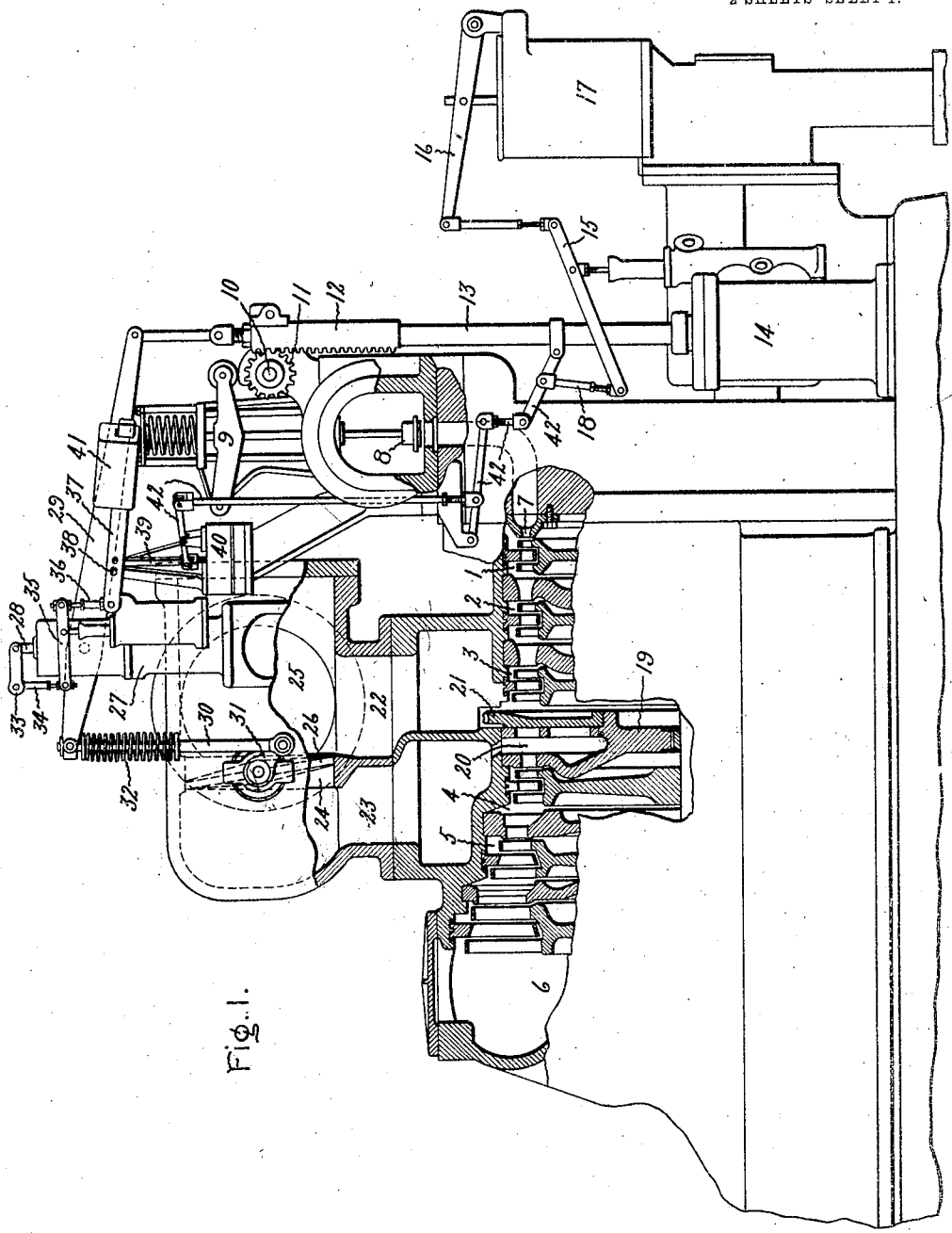

E. D. DICKINSON.
COMBINED EXTRACTION AND MIXED PRESSURE TURBINE.
APPLICATION FILED OCT. 24, 1914.

1,126,414.

Patented Jan. 26, 1915.
2 SHEETS—SHEET 1.

Witnesses:
Lester H. Bulmer
J. Ellis Glen

Inventor:
Edgar D. Dickinson,
by Albert G. Davis
His Attorney.

E. D. DICKINSON.
COMBINED EXTRACTION AND MIXED PRESSURE TURBINE.
APPLICATION FILED OCT. 24, 1914.

1,126,414.

Patented Jan. 26, 1915.
2 SHEETS—SHEET 2.

Witnesses:
George W. Tilden
J. Ellis Eler

Inventor:
Edgar D. Dickinson,
by Albert G. Davis
His Attorney.

UNITED STATES PATENT OFFICE.

EDGAR D. DICKINSON, OF SCHENECTADY, NEW YORK, ASSIGNOR TO GENERAL ELECTRIC COMPANY, A CORPORATION OF NEW YORK.

COMBINED EXTRACTION AND MIXED-PRESSURE TURBINE.

1,126,414.  Specification of Letters Patent.  Patented Jan. 26, 1915.

Application filed October 24, 1914. Serial No. 868,410.

*To all whom it may concern:*

Be it known that I, EDGAR D. DICKINSON, a subject of the King of Great Britain, residing at Schenectady, county of Schenectady, State of New York, have invented certain new and useful Improvements in Combined Extraction and Mixed-Pressure Turbines, of which the following is a specification.

This invention relates to that class of steam turbines wherein a portion of the motive fluid exhausting from a suitable pressure stage or region is utilized in an extraction or consumption system for some industrial purpose, such as heating, cooking, drying or the like. In a pending application of mine, filed Oct. 7, 1912, Serial No. 724,267, I have shown a turbine of this sort in which the steam pressure in the extraction or consumption system is kept constant by providing a bypass for conducting the excess steam to the next lower stage of the turbine, said bypass having a throttle valve controlled not only by a pressure responsive device exposed to the pressure in the extraction system but also by the speed governor which controls the high pressure admission valves of the turbine. The consequence is that the action of the pressure responsive device in opening the bypass to reduce the pressure in the consumption system, which tends to speed up the turbine by admitting more steam to the lower stages, is counteracted by the closing movement of the high pressure valves, reducing the initial supply of steam to the turbine, and thus causing it to maintain a constant speed irrespective of the demand of the consumption system.

The present invention follows the lines of the former one and in construction closely resembles it. But a further provision is made for utilizing in the turbine any excess of steam in the extraction or consumption system. In other words, the turbine is floated on the steam line, and operates automatically either as an extraction turbine feeding low pressure steam to the consumption system, or as a mixed pressure turbine using the excess low pressure steam from the consumption system to carry or assist in carrying the load on the turbine; there being some kinds of apparatus which at times call for a supply of low pressure steam and at other times produces such a supply. So far as I am aware nobody has heretofore attempted to meet this situation.

My invention therefore comprises a turbine having a bypass between two stages thereof, controlled by a valve which opens and closes simultaneously with the high pressure admission valve or valves under the control of the speed governor, an extraction conduit leading from an intermediate region of low pressure in advance of the bypass valve, and a pressure-responsive device connected to the intermediate pressure region and operating also to open and close the aforesaid valves simultaneously but in opposite directions. The result of this combination and arrangement of parts is to give complete control of the machine and enable it to work satisfactorily either as an extraction turbine or as a mixed pressure turbine, changing from one to the other automatically as conditions may require.

Figure 2:
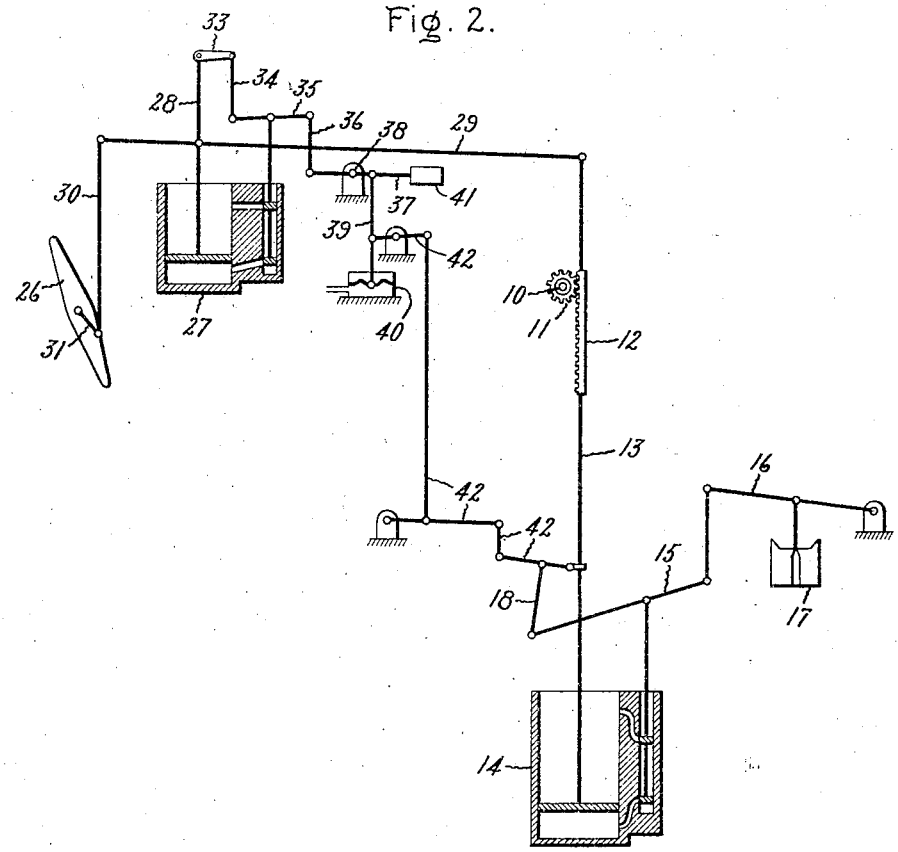

In the accompanying drawing Figure 1 is an elevation, partly in section, of a horizontal turbine embodying my improvements, and Fig. 2 is a diagram of the operating mechanism.

The turbine illustrated is of the Curtis type, having three high pressure stages 1, 2, 3 and three low pressure stages 4, 5, and 6; but the invention is not limited to this type of turbine or to the specified number of stages. High pressure steam is admitted to stage 1 through nozzles 7 controlled by valves 8 which are lifted by levers 9 actuated by cams on a cam shaft 10. A pinion 11 on this shaft meshes with a rack 12 on the piston rod 13 of a hydraulic motor 14, whose regulator or pilot valve is connected to a floating lever 15 connected at one end to the arm 16 of the speed governor 17. The other end of the floating lever is connected to the piston rod 13 by a follow-up link 18. When the governor weights move outwardly and push down the pilot valve, the motor lifts the piston rod 13 and closes one or more of the nozzle valves 8.

Between the stages 3 and 4 is an extra diaphragm 19 containing an annular chamber 20 which communicates by suitable ports with stage 3 and by nozzles with stage 4. An annular valve 21 controls the ports and can be adjusted by hand, so that said ports can be opened or closed at will. Around this diaphragm is a bypass comprising a chamber 22 opening from the stage 3, a chamber 23 communicating with the chamber 20 in the diaphragm 19, and a passage 24 connecting the chambers 22, 23. A conduit 25 leads from the chamber 22 to a heating or other consumption system, and an overflow valve 26 of the butterfly type for example, controls the passage 24, so that any excess of steam not needed in the consumption system can be shunted to the lower stages of the turbine.

The overflow valve is operated by a hydraulic motor 27 whose piston rod 28 is pivoted to a floating lever 29 connected at one end to the piston rod 13 of the motor 14 and at the other end by a rod 30 to the arm 31 on the spindle of the valve 26. A spring 32 affords a yielding connection between the lever 29 and the rod 30.

An arm 33 is rigidly fastened to the piston rod 28, and a link 34 connects this arm to a floating lever 35 pivoted to the pilot valve of the motor 27 and also to a link 36 connecting it to a lever 37 which is fulcrumed at 38 and is pivoted to the stem 39 extending up from the movable abutment of a pressure responsive device 40. An adjustable weight 41 is mounted on the lever 37. Steam admitted from the chamber 22 acts upon the under side of the abutment. By a system of levers and links 42, any movement of the stem 39 is also imparted in the opposite direction to the link 18, lever 15 and the pilot valve of the valve actuating motor 14.

The operation is as follows: Assume first, a steady load on the turbine, and let the demand for steam in the extraction system increase. This will lower the pressure in chamber 22 and the abutment in the pressure-responsive device 39 will fall, allowing the weight 41 to lift the pilot valve of the motor 27 which lowers the left hand end of lever 29 and more or less closes the bypass throttle valve 26. This reduces the flow of steam to the lower stages of the turbine and builds up the falling pressure in chamber 22 so as to restore the pressure in the extraction system. Meanwhile, the lowering of the stem 39 of the pressure responsive device has also acted upon the links and levers connecting it with the pilot valve of the motor 14, lifting said valve and causing the motor to pull down the rack 12 and open more of the high pressure admission valves. The increased flow of high pressure steam to the higher stages enables the turbine still to carry the load and also helps in maintaining the pressure in the extraction system. Conversely, if the demand for extraction steam lessens, producing a higher pressure in the chamber 22, the bypass valve 26 will open wider and some of the nozzle valves 8 will close; thus restoring the normal pressure in the extraction system and preventing the turbine from speeding up. In other words, with a constant load on the turbine, the total quantity of steam flowing through the valves 8 and 26 is automatically proportional, irrespective of the variations in the demand of the extraction system.

Secondly, assume a variable load on the turbine, with a steady demand for extraction steam. If the load increases, the turbine tends to slow down, and the speed governor causes the motor 14 to pull down the rack 12 and open up more high pressure admission valves 8. The increased flow of steam into chamber 22 would tend to raise the pressure in the extraction system, but this is counteracted by the opening of the bypass valve 26 by means of the floating lever 29, actuated by the downwardly moving piston rod 13 and fulcruming on the piston rod of the motor 27. Conversely, a decrease in the load on the turbine will close some of the valves 8 and will also partly close the bypass valve, to maintain in the extraction system a constant supply of steam at constant pressure.

Thirdly, assume a steady load on the turbine, and a condition in the extraction system under which low pressure steam is present in excess of the demand. The excess of this low pressure steam will flow back into the chamber 22 and pass through the bypass to the lower stages of the turbine. This will tend to increase the pressure in the chamber 22, and will also increase the speed of the turbine. The pressure regulator and the speed governor will therefore act together to reduce the supply of high pressure steam in order to maintain a steady speed of the turbine, which will now be running as a mixed pressure machine. If the supply of low pressure steam from the extraction system increases, the bypass valve will open wider and nozzle valves 8 will close; because increase of pressure in chamber 22 causes the pressure responsive device 40 to push down the pilot valves of both motors 14 and 27, thereby causing the former to close some of the nozzles 8 and the latter to open the bypass valve wider. A lessened supply of low pressure steam will cause a reverse operation of these valves.

Fourthly, assume a constant supply of low pressure steam from the extraction system and a variable load on the turbine. If the load increases, the speed tends to fall, and the speed governor causes the piston rod 13 to drop to open more high pressure valves 8. By means of the lever 29, the rod 13 also pulls the bypass valve wider open to let the additional steam exhausting from stage 3 flow to the lower stages. But if, on the other hand, the load decreases, the speed governor will close both the bypass and the high pressure valves. It appears, therefore, that the speed governor through its control of the motor 14 operates to close and open the valves 8 and 26 simultaneously, while the pressure regulator controls both motors 14 and 27, and operates said valves in opposite directions. With this arrangement, the machine will maintain a practically constant pressure in the extraction system up to the limits of steam supply or demand, necessitated by the load which the generator is carrying. It is apparent that for each load there is a definite amount of steam which may be extracted without crippling the turbine, and conversely, when it is operating on low pressure steam only that amount of steam which is necessary to carry the load on the generator can be taken into the machine.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, a turbine, two regulating valve means therefor, a motor for moving each of said valve means, a speed governor which controls one of said motors and thereby simultaneously opens or closes both the valve means, and a pressure responsive device controlling both motors to simultaneously open one valve means and close the other.

2. In combination, a turbine, two regulating valve means therefor, two motors, one of which is capable of moving both of said valve means and the other motor but one of them, each motor having a regulator, a speed governor controlling the regulator of one motor, and a pressure responsive device controlling both of said regulators independently of the speed governor.

3. In combination, a turbine, a conduit connected to a region of intermediate pressure of said turbine, a valve controlling the admission of high pressure fluid to said turbine, a valve controlling the flow of fluid from the region of intermediate pressure to lower stages of the turbine, a separate motor for each valve, a speed governor which controls the high pressure valve motor, means whereby said motor acts on both valves to simultaneously open and close the same, and a device responsive to the fluid pressure in said intermediate region which causes both motors to operate said valves in opposite directions.

4. The combination with a turbine having a region of intermediate pressure, of a conduit connected with said region, valve means admitting high pressure steam to said turbine, a motor for actuating said valve means, and provided with a pilot valve, a speed governor connected to said pilot valve, a bypass valve controlling the flow of steam from the region of intermediate pressure to lower stages of the turbine, a second motor, a floating lever pivoted to the piston rods of both motors and also connected to the bypass valve, a device responsive to the intermediate pressure controlling said second motor, and a system of links and levers connecting said pressure device with the pilot valve of the first motor.

In witness whereof, I have hereunto set my hand this 23rd day of October, 1914.

EDGAR D. DICKINSON.

Witnesses:
HELEN ORFORD,
MARGARET E. WOOLLEY.